United States Patent
Cho

(12) 
(10) Patent No.: US 6,208,236 B1
(45) Date of Patent: Mar. 27, 2001

(54) ALARM MEMO METHOD USING TIME RESERVATION FUNCTION

(75) Inventor: Sung Won Cho, Seoul (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 08/753,594

(22) Filed: Nov. 27, 1996

Related U.S. Application Data

(63) Continuation of application No. 07/704,101, filed on May 22, 1991, now abandoned.

(30) Foreign Application Priority Data

Jun. 13, 1990 (KR) .................................................. 90-8689

(51) Int. Cl.[7] .................................................. G08B 1/00
(52) U.S. Cl. ..................................... 340/309.15; 386/83
(58) Field of Search .................. 330/309.15; 386/83; 358/5; 368/243, 244

(56) References Cited

U.S. PATENT DOCUMENTS

| | | | |
|---|---|---|---|
| 4,074,251 | * | 2/1978 | Creely ............................. 340/309.15 |
| 4,616,261 | * | 10/1986 | Crawford et al. .................... 358/181 |
| 4,620,229 | * | 10/1986 | Amano et al. ...................... 358/194.1 |
| 4,706,121 | * | 11/1987 | Young ................................. 358/142 |
| 4,963,994 | * | 10/1990 | Levine ................................. 358/335 |
| 5,047,867 | * | 9/1991 | Strubbe et al. ....................... 358/335 |

* cited by examiner

*Primary Examiner*—Edward Lefkowitz
(74) *Attorney, Agent, or Firm*—Robert E. Bushnell, Esq.

(57) ABSTRACT

The present invention discloses an alarm memo method using time reservation function in a controller of a video tape recorder with a SYSCON integrated circuit having both a timer function and an on screen display function which displays a particular display on screen by controlling a on screen display block according to the signal applied from a remote control device, in which a mode decision routine decides whether it is in the mode of storing a particular alarm memo, a time input routine sets a reserved time to be displayed of the particular alarm memo to an alarm timer, a data input process puts in the data to be memorized, a standby decision step decides whether the alarm timer is in standby state, and a display routine displays the stored alarm memo data during the reserved time. Reminding a user of something to easily forget is attained by displaying a stored alarm memo data on the television screen during its reservation time according to the present invention.

29 Claims, 3 Drawing Sheets

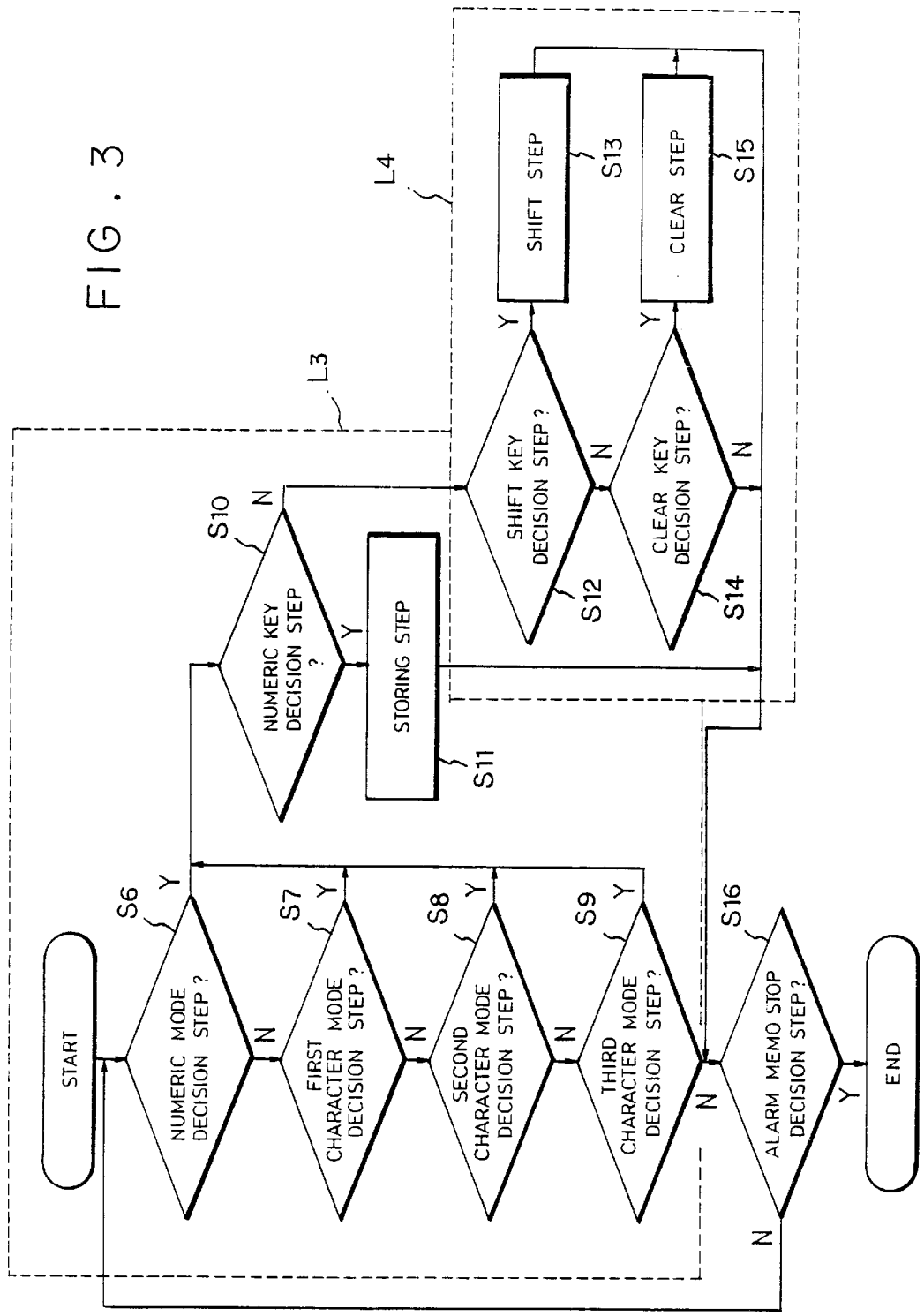

ALARM MEMO METHOD USING TIME RESERVATION FUNCTION

This is a continuation of application Ser. No. 07/704,101, filed on May 22, 1991 now abandoned.

BACKGROUND OF THE INVENTION

The present invention relates to an alarm memo method in a video tape recorder, more particularly to an alarm memo method using time reservation function which is able to display alarm memo data as an on/screen display on CRT screen at a predetermined time after storing alarm memo data in the video tape recorder FIG. 1 is a block diagram representing conventional on screen display circuit in the video tape recorder, which has capabilities of conventional time reservation function and an on screen display function.

In this conventional on/screen display circuit, the data applied from the remote control device(RE), i.e. the normal data used to drive a video tape recorder and the data used to reserve time, are stored into a storing block(for example, a RAN as shown in FIG. 1) via a SYSCON integrated circuit(IC) which is a microprocessor.

In such a case, the storing block(RAM) is composed of nonvolatile RAMs(NVRAM), which are normally used to memorize PAL-type channel data, so that it can retain stored data even in the case of power-turned-off condition.

Also, with the timer function which can set reservation time required by a user, the SYSCON integrated circuit(IC) applies stored channel data into a tuner block(TU) at the predetermined time.

At the same time, the SYSCON integrated circuit(IC) applies the on/screen display signal data matching to the reserved functions, e.g, channel number, volume status, etc, into the on/screen display block(OSD). The on/screen display signal in the on screen display block(OSD) is again applied into the tuner (TU) that it can be displayed on the CRT screen along with the image signal of the assigned channel.

The SYSCON integrated circuit(IC) is connected to a luminance and chrominance signal (Y/C), a servo (SE), and a digitron(DI) which displays the status of video tape recorder.

As described above, a conventional on/screen display function has given lots of convenience to users by displaying the current status of a video tape recorder and the reserved function as an on/screen display on television/screen. However, this convenience can be improved further if there is an alarm memo function that allow users to leave a memo to another person, and that the memo is displayed at the reserved time along with the conventional on/screen display function.

Otherwise, users normally have to use a paper to leave a message concerning a video tape recorder and other matters to the other person, but in this case the other person who is watching television is easy to forget the time written in the paper and then find the paper afterwards.

SUMMARY OF THE INVENTION

It is an object of the present invention to provide an alarm memo function which can store a memo using the conventional video tape recorder having a reservation function and display the memo on television screen at the reserved time using a time reservation function.

According to the present invention, there is provided an alarm memo method using time reservation function in a controller of a video tape recorder with a SYSCON integrated circuit having both a timer function and an on screen display function which displays a particular display on screen by controlling an on/screen display block according to the signal applied from a remote control device, the method comprising the steps of:

a mode decision routine which decides whether it is in the mode of storing a particular alarm memo;

a time input routine which sets a reserved time to be displayed of the particular alarm memo to an alarm timer;

a data input process which puts in the data to be memorized;

a standby decision step which decides whether the alarm timer is in standby state; and a display routine which displays the stored alarm memo data during the reserved time.

BRIEF DESCRIPTION OF THE DRAWINGS

These and other objects, features, and advantages of the present invention will become more apparent from the following description of the preferred embodiments taken in conjunction with the accompanying drawings, in which

FIG. 3 is a flowchart showing the input process among the action flows of the alarm memo using the time reservation function.

DETAILED DESCRIPTION OF THE INVENTION

The present invention will be now described in more detail with reference to the accompanying drawings.

Figure 1:
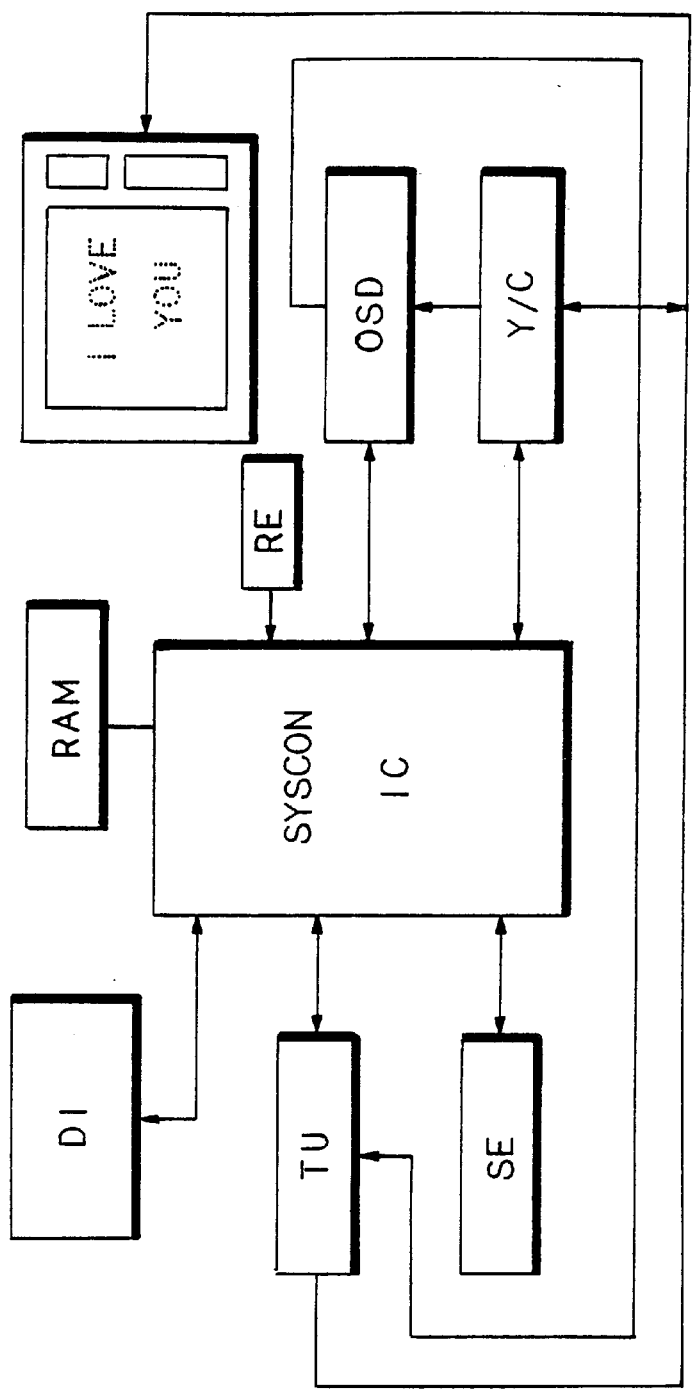
FIG. 1 is a block diagram representing the on/screen display circuit used in the conventional video tape recorder.
Figure 2:
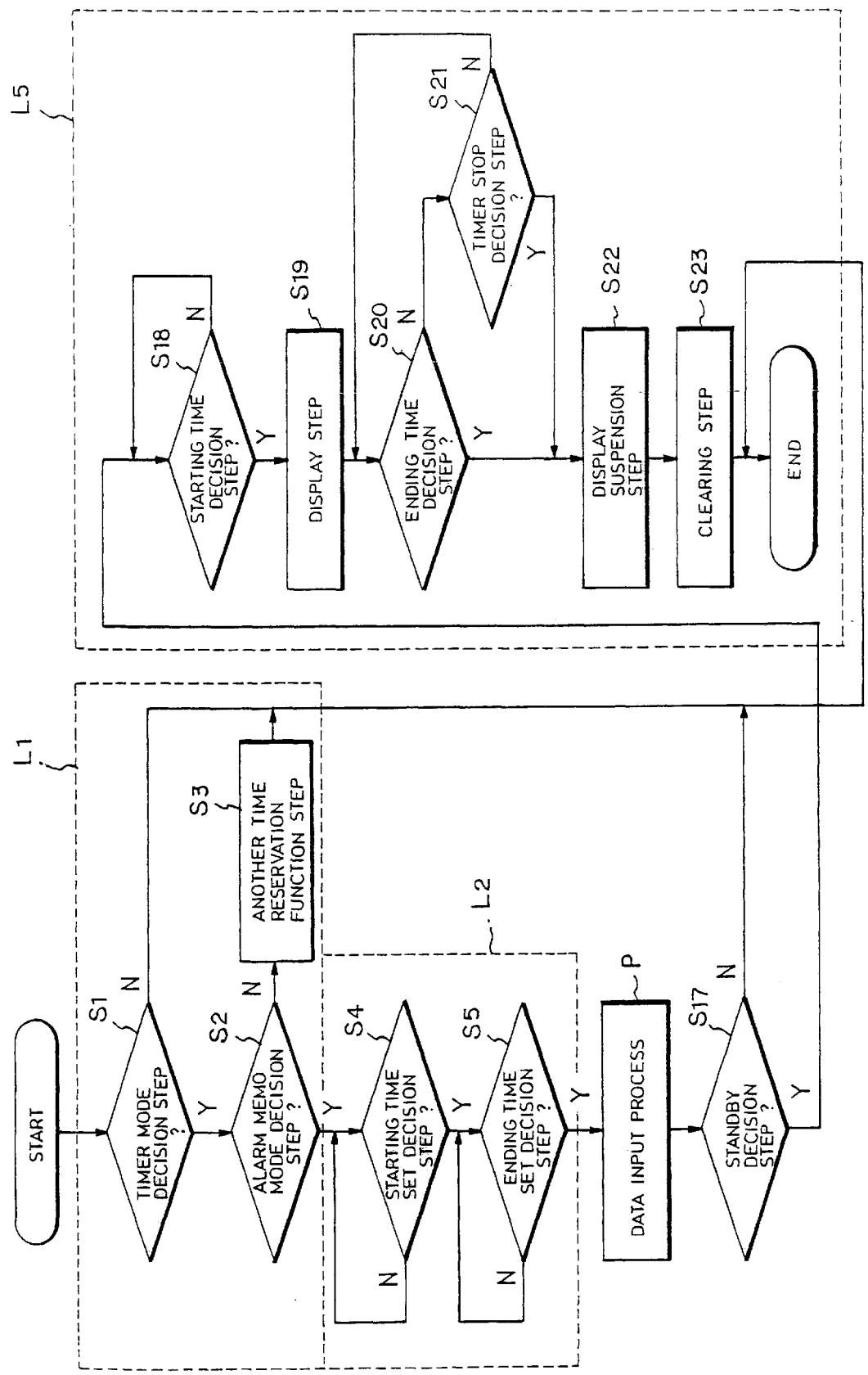
FIG. 2 is a flowchart showing the action flows of the alarm memo using the time reservation function.

FIG. 2 is a flowchart showing the action flows of the alarm memo using the time reservation function, comprising a mode decision routine(L1), a time input routine(L2), an input process(P), a standby decision step(S17), and a display routine(L5). These action flows can be achieved by using the conventional on/screen display circuit as hardware.

This invention includes a character mode key(CH) in addition to a normal key matrix used in a conventional remote control device. The SYSCON integrated circuit(IC) is able to interpret the input signal as one of four modes depending upon how the character mode key(CH) is operated.

Three types of switching signals are produced according to the character mode key(CH). If the numeric key is selected before the character mode key(CH) is selected, the number selected is recognized as in a conventional way. However, if the numeric key is selected after the character mode key(CH) is selected, the number selected is recognized as a character.

In the present invention, three different characters(e.g. alphabet) are assigned to each numeric key. The SYSCON integrated circuit (IC) interprets a selected number as a specific character depending upon the current switching status and the key selected, if the numeric key is selected after the character mode key(CH). For example, after three types of switching signals are produced, one of three characters, A, B and C can be indicated by the numeric key designated as 1. In detail, if the numeric key 1 is selected after a first switching signal is produced by selecting the appropriate character mode key(CH), the SYSCON integrated circuit interpretes the numeric key 1 as a character, A. The numeric key 1 can be interpreted as characters B and C, respectively, if it is produced after a second and a third switching signals are produced.

Each routine in the present invention has several steps as described below.

The mode decision routine(L1) which decides whether the SYSCON integrated circuit(IC) is in the mode of storing a particular alarm memo performs the following steps in sequence; a timer mode decision step(S1) which decides whether it is in(a time reservation mode) an alarm memo mode decision step(S2) which decides whether it is in the alarm memo mode, and another time reservation function step(S3) which performs other types of time reservation functions if it is not in the mode of alarm memo after the alarm memo mode decision step(S2) is done.

The time input routine(L2) performs following steps in sequence so as to set a time reserved to display the stored alarm memo data; a starting time set decision step (S4), deciding whether the time to display the alarm memo data is set and an ending time set decision step (S5), deciding whether the time to stop displaying the alarm memo data is set.

The data input process(P) which puts in the data to be memorized performs following routines in sequence; a data storing routine(L3) which stores character or numeric data, a data modification routine(L4) which shifts or makes clear the stored data, and an alarm memo stop decision step (S16).

At this time, the data storing routine(L3) performs following steps in sequence; a numeric mode decision step(S6) which decides whether the character mode key(CH) or the numeric mode key is selected, the first, second and third character mode decision steps(S7)(S8)(S9) which decide whether it is in the first, second and third character modes, respectively, according to the switching status of the character mode key(CH), a numeric key decision step(S10) which decides whether the numeric key is selected, and a storing step(S11) which stores numeric or character data depending upon the current status of the character mode and the selected numeric key.

The data modification routine(L4) performs following steps in sequence; a shift key decision step(S12) which decides whether the shift key is selected and a shift step (S13) which makes space between data to be displayed.

If the shift key is not selected after performing the shift key decision step(S12), following steps are performed in sequence; a clear key decision step(S14) which decides whether the clear key is selected and a clear step(S15) which makes cursor move back to the previous position after deleting the displayed alarm memo data at the current position. Finally, the alarm memo stop decision step (S16) decides whether the alarm memo input mode is over.

The display routine(L5) performs following steps in sequence; a standby decision step(S17), a starting time decision step(S18) which decides whether it is on time to display alarm memo data, a display step(S19) which displays alarm memo data, an ending time decision step(S20) which decides whether it is on time to stop displaying alarm memo data, a timer-stop decision step(S21) which decides whether the timer is stopped before reaching the ending time, a display suspension step (S22) which suspends displaying alarm memo data, and a clearing step(S23) which clears the stored alarm memo data.

With the above routines and steps in the present invention, the alarm memo using time reservation function can be explained from the procedure point of view as described below.

In the beginning, the SYSCON integrated circuit(IC) performs the timer mode decision step(S1) which decides whether it is in the time reservation mode, after deciding if the time reservation key is selected on the keymatrix of a remote control device.

In the case of time reservation mode, the alarm memo mode decision step(S2) decides whether it is in the alarm memo mode. If it is the case, the time input routine(L2) is performed. Otherwise, another time reservation function step(S3) performs other types of time reservation functions.

In the time input routine(L2), the starting time set decision step (S4) decides whether the user puts in the starting time to display the alarm memo data and whether the timer is set to the time. If the time input routine(L2) is over, the ending time set decision step (S5) decides whether the user puts in the ending time to stop displaying the alarm memo data and whether the timer is set to the time.

After the ending time set decision step (S5), the numeric mode decision step(S6) decides whether the character mode key(CH) or the numeric key is selected. If the case of character mode key(CH) is selected, the first, the second and the third character mode decision steps(S7)(S8)(S9) are performed in sequence depending upon the switching status of the character mode key(CH).

In detail, after the first, second and third character mode decision steps(S7)(S8)(S9) decide current switching status, the selected numeric key is interpreted as described in the table below;

TABLE 1

| selected numeric key | first mode | second mode | third mode |
|---|---|---|---|
| 1 | A | B | C |
| 2 | D | E | F |
| 3 | G | H | I |
| 4 | J | K | L |
| 5 | M | N | O |
| 6 | P | Q | R |
| 7 | S | T | U |
| 8 | V | W | X |
| 9 | Y | Z | ? |
| 0 | , | / | = |

In short, a character can be decided in terms of the mode decided by the first, second and third mode decision steps (S7)(S8)(S9) and the numeric key identified by the numeric key decision step(S10).

That is, if a user wants to put in characters, he can simply put in numeric keys appropriate to the needed character after controlling the character mode key.

Then, after the numeric key decision step(S10) decides whether the numeric key is selected, the storing step(S11) stores character data chosen in reference to Table 1.

In brief, in the data storing routine(L3), when the character mode key (CH) is put in, the mode is decided according to the switching status of the character mode key(CH). After the selected numeric key is detected by the numeric key decision step(S10), the storing step(S11) stores character chosen in reference to Table 1. If the numeric key is not preceded by the character mode key(CH), the storing step (S11) stores the selected number after the numeric key decision step(S10) decides its occurring.

If it is decided in the numeric key decision step(S10) that the numeric key is not selected, the control is turned over to the data modification routine (L4). In the routine(L4), the shift key decision step(S12) decides whether the shift key is selected. If it is the case, the shift step(S13) makes space between the alarm memo data displayed.

Unless the shift key is selected, the clear key decision step(S14) decides whether the clear key is selected. If it is the case, the clear step(S15) makes cursor move back to the previous position after deleting the displayed alarm memo data at the current position.

The alarm memo stop decision step (S16) decides whether the alarm memo function is halted by a user. If halted, the standby decision step(S17) is run to decide whether the timer is in standby state. If the timer is not in standby state, the SYSCON integrated circuit(IC) terminates whole processes.

In the meantime, if the time to display the alarm memo data is reached during the timer standby state, the display routine(L5) which displays the alarm memo data during the reservation time drives its sub-steps. In this routine (L5), the starting time decision step(S18) decides whether it is on time to display the alarm memo data. If it is the case, the display step(S19) displays the stored alarm memo data on the television screen.

While the display step(S19) is performing its role, the ending time decision step(S20) decides whether it is on time to stop displaying the alarm memo data.

If it is time to stop, or if the timer-stop decision step(S21) decides that the timer key is selected to stop timer, resulting in the timer stopped, even before reaching the ending time, the display suspension step(S22) suspends displaying the alarm memo data.

Thereafter, the displayed alarm memo data is cleared by the clearing step (S23). Finally, the SYSCON integrated circuit turns the condition of the video tape recorder to the previous one, e.g. if the the video tape recorder was turned off before displaying the alarm memo data, the video tape recorder will be turned off again after displaying the alarm memo data.

As mentioned above, the present invention can carry out storing alarm memo data by means of the keymatrix on the remote control device based upon the video tape recorder having the reservation function and displaying the stored alarm memo data on the television/screen during the reservation time, thereby reminding the user of something easy forget.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications of embodiments as fall within the true scope of the invention.

What is claimed is:

1. A process for visually broadcasting alarm memoranda, comprising:

determining whether a video system driving a visual display to provide visual presentations of different images varying as a function of time in response to control signals generated by a remote controller and time signals generated by a timer as an indication of current time, is in a mode for storing said alarm memoranda within a memory of said video system;

while said video system is in said mode for storing said alarm memoranda, establishing a first time for automatically initiating a visual presentation of an alarm memorandum on said visual display, and establishing a second and later time for automatically discontinuing said visual presentation;

storing said alarm memorandum comprised of data provided by a user, corresponding to a plurality of alphanumeric symbols;

while said video system is in a programming mode for reserving time for receiving video signals, designating a channel number and reserving a selected time to receive images broadcast via said channel number during said selected time;

during a recording mode, responding to an indication by said time signals of an occurrence of said selected time by receiving said images broadcast on said channel number designated during said selected time; and independently of said selected time, independently of any images broadcast on said channel number designated and independently of said stored data corresponding to said channel number designated, responding to an indication by said time signals of an occurrence of said first time, by automatically providing said visual presentation upon said visual display during an interval between said first time and said second time.

2. The process of claim 1, further comprised of:

automatically initiating said visual presentation of said alarm memorandum upon said occurrence of said first time, independently of said control signals.

3. The process of claim 1, further comprised of:

automatically ceasing said visual presentation of said alarm memorandum upon occurrence of said second time, independently of said control signals.

4. The process of claim 1, further comprised of:

automatically initiating said visual presentation of said alarm memorandum upon said occurrence of said first time, independently of said control signals; and automatically ceasing said visual presentation of said alarm memorandum upon occurrence of said second time, independently of said control signals.

5. The process of claim 1, further comprised of:

performing said step of storing said alarm memorandum by manipulating a keypad on said remote controller to write said data into said memory.

6. The process of claim 1, further comprised of:

ceasing said visual presentation of said alarm memorandum upon occurrence of said second time; and clearing said data from said memory after occurrence of said second time.

7. The process of claim 1, further comprised of:

initiating said visual presentation of said alarm memorandum upon said occurrence of said first time, independently of said control signals;

ceasing said visual presentation of said alarm memorandum upon occurrence of said second time, independently of said control signals; and clearing said data from said memory after occurrence of said second time.

8. The process of claim 1, further comprised of:

ceasing said visual presentation of said alarm memorandum upon occurrence of said second time; and making a determination of whether said video system was turned off before said visual presentation of said alarm memorandum during said interval; and turning said video system off after said visual presentation of said alarm memorandum when said determination establishes that said video system was turned off before said visual presentation of said alarm memorandum during said interval.

9. The process of claim 1, further comprised of:

initiating said visual presentation of said alarm memorandum upon said occurrence of said first time;

ceasing said visual presentation of said alarm memorandum upon occurrence of said second time;

clearing said data from said memory after occurrence of said second time;

making a determination of whether said video system was turned off before said visual presentation of said alarm memorandum during said interval; and turning said video system off after said visual presentation of said alarm memorandum when said determination establishes that said video system was turned off before said visual presentation of said alarm memorandum during said interval.

10. A process for visually broadcasting alarm memoranda, comprising:

determining whether a video system driving a visual display to provide visual presentations of different images varying as a function of time in response to control signals generated by a remote controller and time signals generated by a timer as an indication of current time, is in a mode for storing said alarm memoranda within a memory of said video system;

while said video system is in said mode for storing said alarm memoranda, establishing a first time for automatically initiating a visual presentation of an alarm memorandum on said visual display, and establishing a second and later time for automatically discontinuing said visual presentation;

storing said alarm memorandum comprised of data provided by a user, corresponding to a plurality of alphanumeric symbols; and responding to an indication by said time signals of an occurrence of said first time, by initiating said visual presentation of said alarm memorandum, independently of said control signals.

11. The process of claim 10, further comprised of:

automatically initiating said visual presentation of said alarm memorandum upon said occurrence of said first time.

12. The process of claim 10, further comprised of:

ceasing said visual presentation of said alarm memorandum upon occurrence of said second time, independently of said control signals.

13. The process of claim 10, further comprised of:

automatically initiating said visual presentation of said alarm memorandum upon said occurrence of said first time; and automatically ceasing said visual presentation of said alarm memorandum upon occurrence of said second time.

14. The process of claim 10, further comprised of:

performing said step of storing said alarm memorandum by manipulating a keypad on said remote controller to write said data into said memory.

15. The process of claim 10, further comprised of:

ceasing said visual presentation of said alarm memorandum upon occurrence of said second time; and clearing said data from said memory after occurrence of said second time.

16. The process of claim 10, further comprised of:

initiating said visual presentation of said alarm memorandum upon said occurrence of said first time;

ceasing said visual presentation of said alarm memorandum upon occurrence of said second time; and automatically clearing said data from said memory after occurrence of said second time.

17. The process of claim 10, further comprised of:

ceasing said visual presentation of said alarm memorandum upon occurrence of said second time; and making a determination of whether said video system was turned off before said visual presentation of said alarm memorandum during said interval; and turning said video system off after said visual presentation of said alarm memorandum when said determination establishes that said video system was turned off before said visual presentation of said alarm memorandum during said interval.

18. The process of claim 10, further comprised of:

initiating said visual presentation of said alarm memorandum upon said occurrence of said first time;

ceasing said visual presentation of said alarm memorandum upon occurrence of said second time;

clearing said data from said memory after occurrence of said second time;

making a determination of whether said video system was turned off before said visual presentation of said alarm memorandum during said interval; and turning said video system off after said visual presentation of said alarm memorandum when said determination establishes that said video system was turned off before said visual presentation of said alarm memorandum during said interval.

19. A video recorder, comprising:

a non-volatile memory;

a remote controller generating control signals regulating a visual display presented by a video system;

a timer generating time signals as an indication of current time;

an on-screen display driving a visual display to provide visual presentations of different images varying as a function of time in response to said control signals and said time signals; and a system controller:

determining whether said video recorder system is in a mode for storing said alarm memoranda within a memory of said video system;

while said video system is in said mode for storing said alarm memoranda, establishing a first time for automatically initiating a visual presentation of an alarm memorandum on said visual display, and establishing a second and later time for automatically discontinuing said visual presentation;

storing said alarm memorandum comprised of data provided by a user, corresponding to a plurality of alphanumeric symbols; and responding to an indication by said time signals of an occurrence of said first time, by automatically providing said visual presentation upon said visual display during an interval between said first time and said second time.

20. The video recorder of claim 19, further comprised of said system controller:

initiating said visual presentation of said alarm memorandum upon said occurrence of said first time;

ceasing said visual presentation of said alarm memorandum upon occurrence of said second time; and automatically clearing said data from said memory after occurrence of said second time.

21. The video controller of claim 19, further comprised of said system controller:

ceasing said visual presentation of said alarm memorandum upon occurrence of said second time; and making a determination of whether said video system was turned off before said visual presentation of said alarm memorandum during said interval; and tuning said video system off after said visual presentation of said alarm memorandum when said determination establishes that said video system was turned off before said visual presentation of said alarm memorandum during said interval.

22. The video controller of claim 19, further comprised of said system controller:

initiating said visual presentation of said alarm memorandum upon said occurrence of said first time;

ceasing said visual presentation of said alarm memorandum upon occurrence of said second time;

clearing said data from said memory after occurrence of said second time;

making a determination of whether said video system was turned off before said visual presentation of said alarm memorandum during said interval; and turning said video system off after said visual presentation of said alarm memorandum when said determination establishes that said video system was turned off before said visual presentation of said alarm memorandum during said interval.

23. A video recorder, comprising:

a tuner selectively discriminating between broadcasts signals received on a plurality of channels;

a non-volatile memory;

a remote controller generating control signals selecting among said plurality of channels and regulating a visual display presented by a video system;

a timer generating time signals as an indication of current time;

an on-screen display driving a visual display to provide visual presentations of different images varying as a function of time in response to video signals carried by said plurality of channels provided by said tuner, on-screen signals for stored data corresponding to respective ones of said plurality of channels, said control signals and said time signals; and a system controller:

determining whether said video recorder system is in a first programming mode for storing alarm memoranda within a memory of said video system;

while said video system is in a second programming mode for reserving time for receiving said video signals, designating a channel number and reserving a selected time to receive images broadcast via said channel number during said selected time;

while said video system is in said first programming mode for storing said alarm memoranda, establishing a first time for automatically initiating a visual presentation of an alarm memorandum on said visual display, and establishing a second and later time for automatically discontinuing said visual presentation;

during said first programming mode, storing said alarm memorandum comprised of data provided by a user, corresponding to a plurality of alphanumeric symbols;

during a recording mode, responding to an indication by said time signals of an occurrence of said selected time by receiving said images broadcast on said channel number designated during said selected time; and during a playback mode, responding to an indication by said time signals of an occurrence of said first time, by initiating said visual presentation of said alarm memorandum, independently of said control signals and independently of said stored data.

24. The video recorder of claim 23, further comprised of said system controller:

initiating said visual presentation of said alarm memorandum upon said occurrence of said first time;

ceasing said visual presentation of said alarm memorandum upon occurrence of said second time; and automatically clearing said data from said memory after occurrence of said second time.

25. The video controller of claim 23, further comprised of said system controller:

ceasing said visual presentation of said alarm memorandum upon occurrence of said second time; and making a determination of whether said video system was turned off before said visual presentation of said alarm memorandum during said interval; and turning said video system off after said visual presentation of said alarm memorandum when said determination establishes that said video system was turned off before said visual presentation of said alarm memorandum during said interval.

26. The video controller of claim 23, further comprised of said system controller:

initiating said visual presentation of said alarm memorandum upon said occurrence of said first time;

ceasing said visual presentation of said alarm memorandum upon occurrence of said second time;

clearing said data from said memory after occurrence of said second time;

making a determination of whether said video system was turned off before said visual presentation of said alarm memorandum during said interval; and turning said video system off after said visual presentation of said alarm memorandum when said determination establishes that said video system was turned off before said visual presentation of said alarm memorandum during said interval.

27. A process for visually broadcasting alarm memoranda, comprising:

determining whether a video system driving a visual display to provide visual presentations of different images varying as a function of time in response to video signals for a plurality of channels provided by a tuner, on-screen signals representative of stored data corresponding to respective ones of said channels, control signals generated by a remote controller and time signals generated by a timer as an indication of current time, is in a first programming mode for storing said alarm memoranda within a memory of said video system;

while said video system is in a second programming mode for reserving time for receiving said video signals, designating a channel number and reserving a selected time to receive images broadcast via said channel number during said selected time;

while said video system is in said first programming mode for storing said alarm memoranda, establishing a first time for automatically initiating a visual presentation of said alarm memorandum on said visual display, and establishing a second and later time for automatically discontinuing said visual presentation;

during said first programming mode, storing said alarm memorandum comprised of data provided by a user, corresponding to a plurality of alpha-numeric symbols;

during a recording mode, responding to an indication by said time signals of an occurrence of said selected time by receiving said images broadcast on said channel number designated during said selected time; and independently of said selected time, independently of any images broadcast on said channel number designated and independently of said stored data corresponding to said channel number designated, during a playback mode responding to an indication by said time signals of an occurrence of said first time, by automatically providing said visual presentation upon said visual display during an interval between said first time and said second time.

28. The process of claim 27, further comprised of:

automatically initiating said visual presentation of said alarm memorandum upon said occurrence of said first time, independently of said control signals.

29. The process of claim 27, further comprised of:

automatically ceasing said visual presentation of said alarm memorandum upon occurrence of said second time, independently of said control signals.

* * * * *